United States Patent [19]
Darling et al.

[11] 3,772,527
[45] Nov. 13, 1973

[54] SELF-CONTAINED EMERGENCY LIGHTING UNITS & ADJUSTABLE SWIVEL ASSEMBLIES

[75] Inventors: Richard Henry Darling, Fairfield; William P. Shine, Monroe, both of Conn.

[73] Assignee: Dual-Lite Company, Newtown, Conn.

[22] Filed: Nov. 24, 1972

[21] Appl. No.: 309,085

[52] U.S. Cl............... 307/66, 285/282, 240/61.12, 240/73, 248/73
[51] Int. Cl. .............................................. H02j 7/00
[58] Field of Search ............................. 307/64, 66; 240/61.11, 61.12, 73 R; 285/164, 266, 160, 282, DIG. 8; 315/86; 248/224, 225, 73, 289, 290, 291, 294

[56] References Cited
UNITED STATES PATENTS

| | | | |
|---|---|---|---|
| 2,567,291 | 9/1951 | Lundquist | 240/61.12 X |
| 2,790,894 | 4/1957 | Zingone | 240/73 |
| 3,418,487 | 12/1968 | Livingston | 307/66 |

Primary Examiner—Robert K. Schaefer
Assistant Examiner—M. Ginsburg
Attorney—Robert H. Ware

[57] ABSTRACT

A universal swivel mounting assembly for emergency exit spotlights, television camera monitors and like devices mounted on walls and ceilings is adapted to be aimed at a particular target area, adjustably positioned and locked in aimed condition. The swivel mounting incorporates a unique, universally adjustable swivel assembly characterized by mating trunnion surfaces, and its internal resilient frictional resistance to adjustment may be overcome by force manually applied during aiming, after which the unit may be locked in aimed condition. A hollow, shouldered T-bolt is telescopingly inserted within a hollow trunnion swivel socket, through an aperture in the socket and through an apertured and covcavely recessed trunnion collar; the T-bolt extends into the interior of a base plate mounting box, and through a resilient deformable friction washer into engagement with a friction nut. All of these parts may be adjusted to secure the assembly for aimed repositioning by overcoming the resilient frictional force supplied by the deformed resilient friction washer. A set-screw positioned in the collar engages the base plate for locked clamping of the assembly in any aimed position. The base plate is pivotally engagable with a slotted mounting box for convenient assembled installation, electrical wiring and adjustment of the device, which is capable of mounting aimable electronic and electro-optical devices on a wall or ceiling surface, providing universal adjustment and concealed inaccessibility as well as tamper-proof protection for as many as ten electrical conductors threaded through the hollow T-bolt into the interior of the base plate for connection with power, switching and other electrical systems.

14 Claims, 8 Drawing Figures

SELF-CONTAINED EMERGENCY LIGHTING UNITS & ADJUSTABLE SWIVEL ASSEMBLIES

BACKGROUND OF THE INVENTION

This invention relates to adjustable universal swivel mountings for use with emergency spotlights, TV camera monitors, aimable microphones, loudspeakers, infrared intrusion sensors and other aimable devices commonly on architectural surfaces such as walls or ceilings, to be adjustably aimed toward a selected target area.

THE PRIOR ART

Conventional, universal or "ball and socket" swivel mountings are well known as supports for adjustable wall lamps, bed lamps, and similar small spotlights. These conventional universal swivel mountings provide extremely limited load-carrying capacity; they rarely carry a load heavier than a common light bulb and a socket, with a single pair of electrical conductors passing through suitable apertures in the ball and socket swivel. Such universal ball and socket type mountings sometimes incorporate internal frictional biasing forces supplied by compression coil springs, exemplified by U.S. Pat. Nos. 1,879,343; 2,862,730; 3,104,067; 3,186,736; 3,278,203 and 3,341,230. These coil springs provide a predetermined amount of frictional biasing force resisting adjustment of the universal ball and socket mountings, but affording no means for increasing or adjusting this biasing force. They provide no way to clamp the universal swivel mounting in any adjusted position. Adjustable trunnion mountings for floor lamps, table lamps and the like have also been proposed from time to time, as in U.S. Pat. Nos. 3,089,028 and 3,341,230, but these have likewise failed to provide adjustable friction biasing force or lockable clamping capability for securing the adjusted device in its selected aimed position.

Difficulties are often encountered during the installation of emergency lighting units and like aimable devices requiring adjustable positioning. The great bulk and weight of these devices often requires use of awkward holding jigs or an extra laborer to hold them in position while an installing electrican is connecting their electrical conductors to power cables in the building wall or ceiling.

Thus an important need has long existed for wall and ceiling mounted devices capable of quick and convenient electrical wiring installation, capable of supporting heavy loads in universally adjustable aimed positins, with facility for convenient angular adjustment, in both azimuth and elevation, against adjustable friction biasing force tending to hold them in position during adjustment, and also capable of being clamped or locked in permanent aimed position.

SUMMARY OF THE INVENTION

The devices of this invention provide ample load-carrying ability combined with a wide range of angular adjustment, achieving nearly universal aiming, and firm, sturdy locking in any aimed position. In these devices a swivel assembly is provided with cooperating trunnion surfaces, which co-act to produce widespread support. Resilient biasing produces adjustable frictional engagement of these surfaces, and a locking screw is tightened to clamp them securely in aimed, locked position.

OBJECTS OF THE INVENTION

Accordingly, a principal object of the present invention is to provide a universally adjustable and lockable swivel mounting unit capable of carrying heavy loads, for convenient installation on architectural surfaces such as wall or ceiling, to support aimable devices having directional axes to be aimed toward adjacent target areas.

Another object of the invention is to provide such a universally adjustable swivel mounting incorporating a base plate which may be detachably secured to a wall-mounted installation box, and supported thereby while electrical wiring connections are made, after which the base plate may be conveniently secured in permanently installed position.

A further object of the invention is to provide such a universally adjustable swivel mounting incorporating a swivel socket member integrally formed as a sturdy, unitary portion of the aimable device, for convenient fabrication.

Another object of the invention is to provide such universally adjustable swivel mountings incorporating convenient frictional adjustment mechanisms, permitting the installer to increase or reduce the frictional force tending to resist angular adjusting movement, readily counteracting the unbalanced weight of the supported unit without requiring counterweights.

A still further object of the invention is to provide such a universally adjustable swivel mounting incorporating means for conveniently clamping the adjustable assembly in any desired adjusted position, securing the device firmly against vibration, tampering, temperature change deformation or other forces tending to cause inadvertent displacement from its desired aim or orientation.

Other and more specific objects will be apparent from the features, elements, combinations and operating procedures disclosed in the following detailed description and shown in the drawings.

DETAILED DESCRIPTION

The present emergency lighting units, each supported by an adjustable and lockable universal swivel assembly as illustrated in the figures, are considerably heavier units than ordinary electric lamps supported by ball and socket swivel mountings. These devices are self-contained emergency lighting systems incorporating all components required for emergency lighting in a single dust cover shroud, mounted on a universally adjustable swiveling chassis, as shown in FIG. 4.

SWIVEL SOCKET ASSEMBLY

Emergency lighting device 10 incorporates a self contained emergency lighting unit 11 positionably mounted on a channel-shaped base plate 12. A universal adjustable swivel assembly 13 incorporates a hollow swivel socket 14 having a convex cylindrical sector surface 16 seated in concave trunnion recesses 17 formed in a rotatable swivel collar 18. Each collar 18 is formed with a central aperture 19 aligned with a swivel aperture 21 formed in the face 22 of base plate 12. As clearly shown in FIGS. 3 and 4, the swivel socket 14 forms a downwardly depending unitary extension integral with the emergency lighting unit-supporting chassis 23, forming an unusually solid, stable mounting structure.

Figure 2:
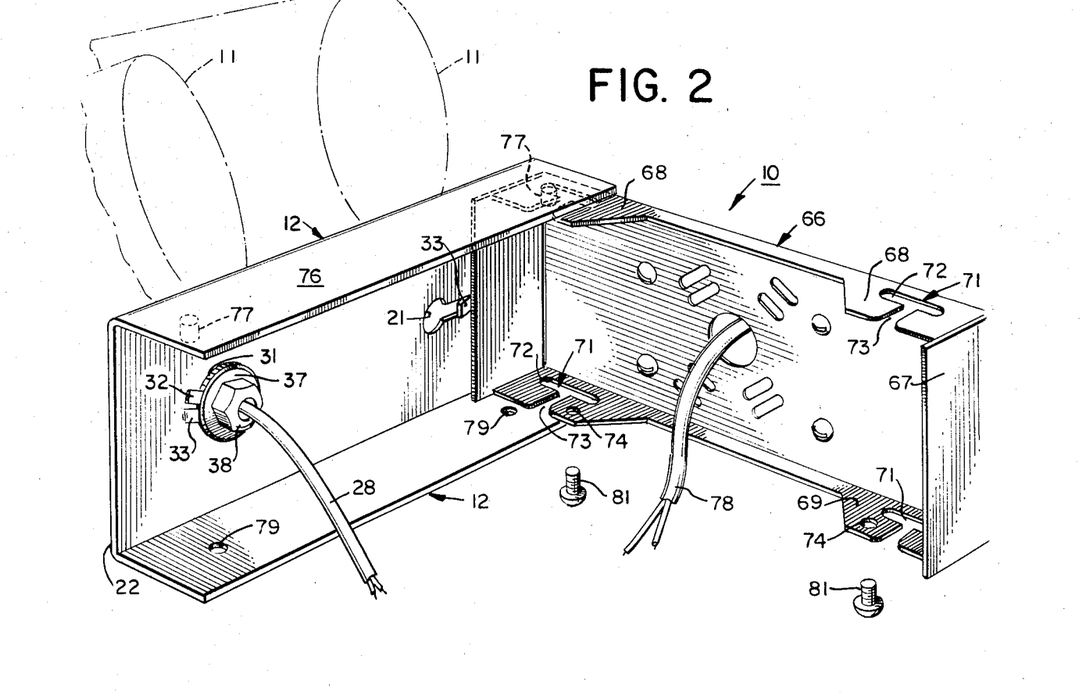
FIG. 2 is a perspective view of the same device with its base plate pivotally mounted on its wall mounting box, and pivoted outward to provide access for electrical wiring installation while supporting the entire weight of the wall emergency lighting unit on the wall box for convenient wiring installation, one of the two adjustable emergency lighting units being shown in phantom to reveal the internal structure of the base plate.
Figure 3:
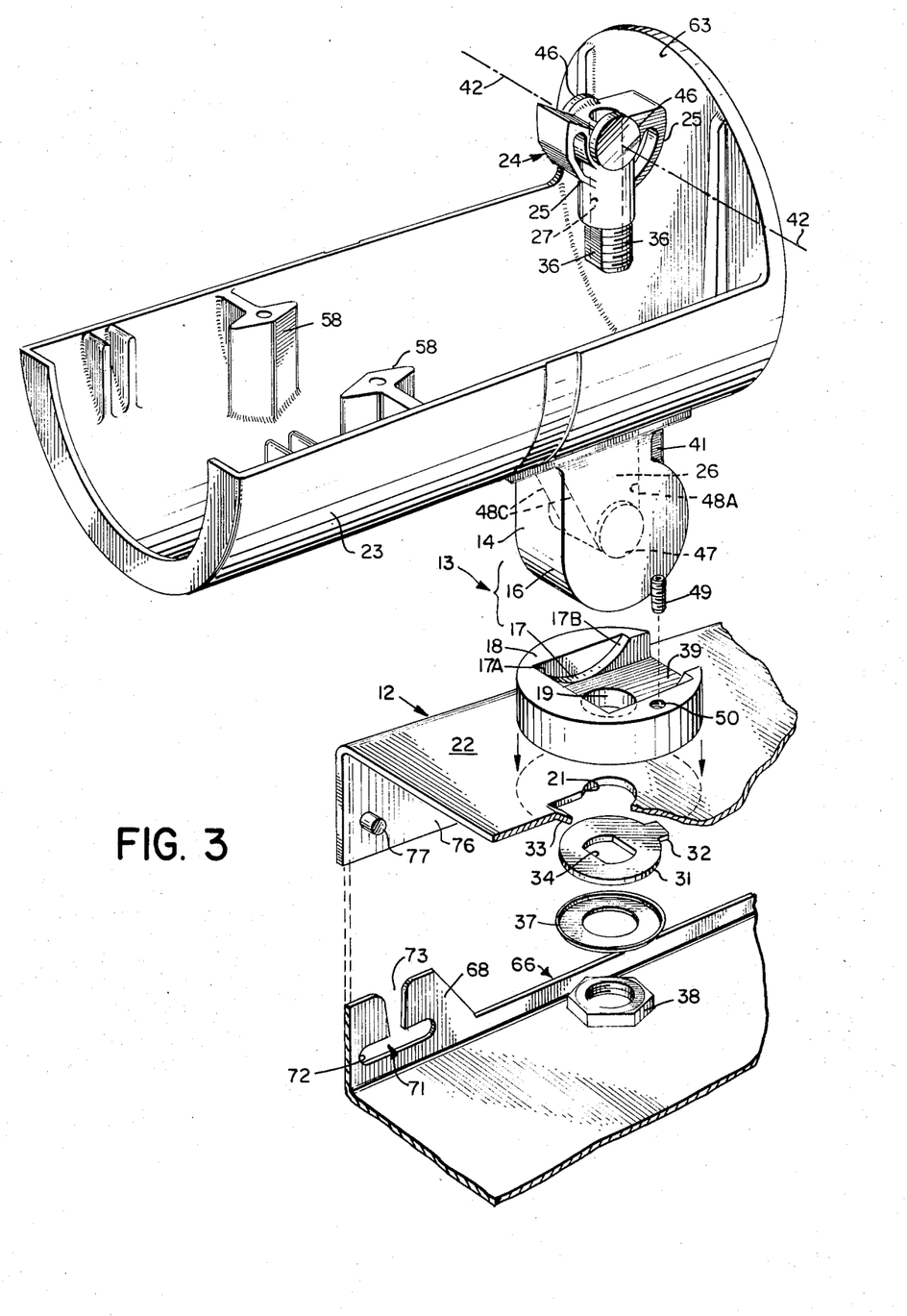
FIG. 3 is a fragmentary exloded perspective view showing a lighting unit of the device of FIG. 1 with its dust-cover shroud removed, illustrating the interfitting and cooperating relationship of the various parts of the device aligned for assembly.
Figure 4:
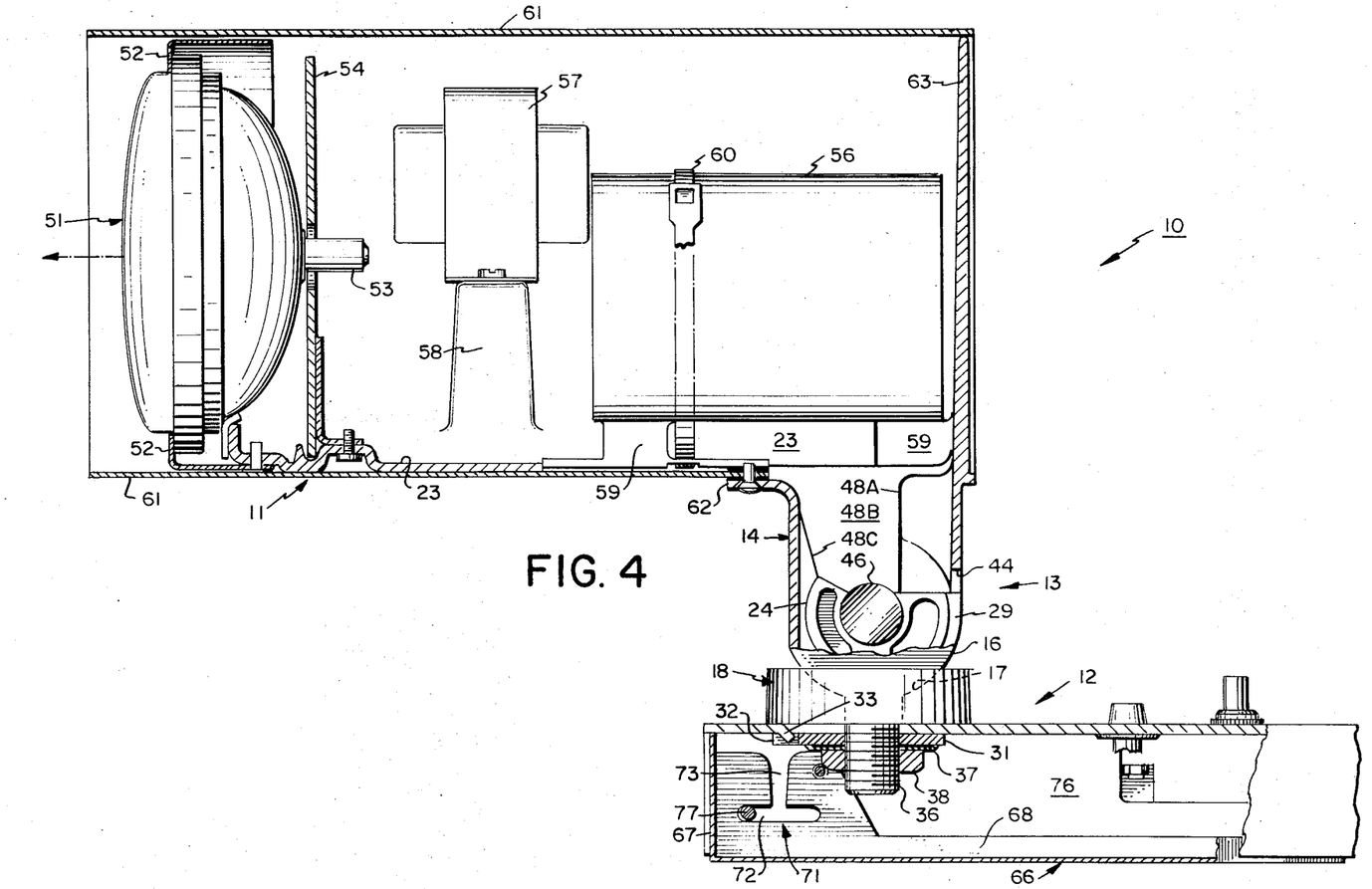
FIG. 4 is a corresponding fragmentary cross-sectional side elevation view of the same device shown in its assembled condition.
Figure 5:
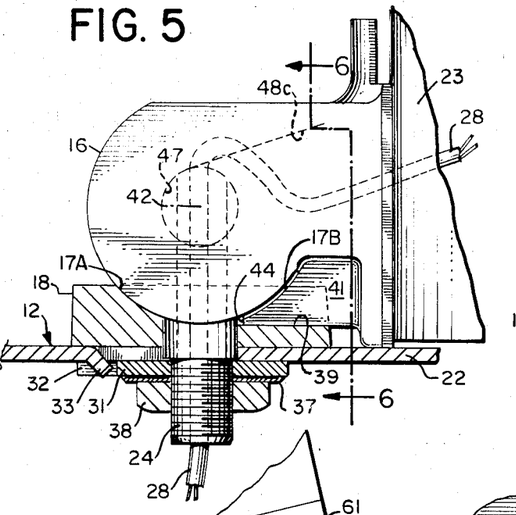
FIG. 5 is a fragmentary side elevation view, partially in cross-section, showing the universal adjustable swivel portion of the device in its back-tilted limit position.
Figure 6:
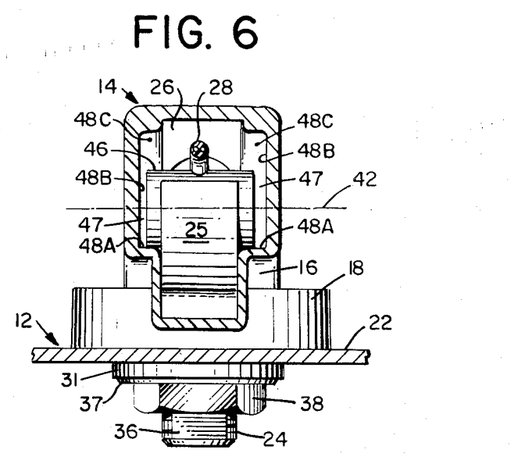
FIG. 6 is a corresponding cross-sectional rear elevation view of the same universal adjustable swivel portion, taken along the plane 6—6 in FIG. 5.
Figure 7:
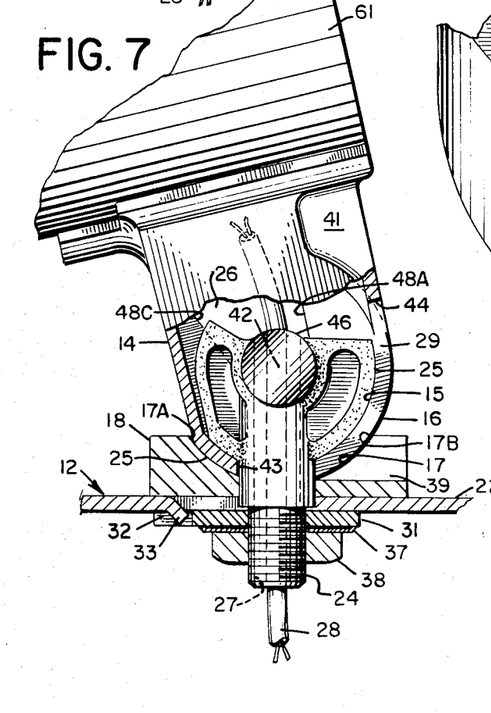
FIG. 7 is a fragmentary side elevation side view, partially in cross-section, showing the universal adjustable swivel portion of the device in its forwardly tilted limit position.

A hollow shouldered T-bolt 24 shown in FIG. 3 is positioned for insertion into a hollow internal cavity 26 within swivel socket 14, as best shown in FIGS. 4, 6 and 7. Hollow shouldered T-bolt 24 is provided with a central bore 27 extending through out its length, and accomodating two, three, four or as many as ten electrical conductors 28, extending from the interior of each self contained emergency lighting unit 11 supported by a chassis 23. Conductors 28 extend through bore 27 and the universally adjustable swivel assembly 13 into the interior of channel-shaped base plate 12 for connection with external power lines, as shown in FIGS. 2, 5 and 7. The shank of T-bolt 24 is dimensioned to extend through an arcuate slot 29 formed in the lower end of the sector bearing surface 16 of swivel socket 14, and thence through apertures 19 and 21.

The lower end of the shank of T-bolt 24 is threaded to accomodate an azimuth limiting washer 31 having a protruding extension 32 extending radially for angular abutting engagement with a rotation limiting internal flange portion 33 formed at the rim of aperture 21 in base plate 12. Washer 31 is keyed to the lower end of the shank of T-bolt 24 by flat chord land portions 34 extending into its central aperture. Lands 34 each engage corresponding flat chord land portions 36 formed on T-bolt 24 by milling, grinding or other fabrication techniques, reducing the diameter of the threaded lower end of the T-bolt 24, as shown in FIGS. 3 and 6.

Being keyed to T-bolt 24 by the cooperation of lands 34 and 36, azimuth limiting washer 31 revolves with T-bolt 24, chassis 23 and collar 18 until the extension 32 engages flange 33, limiting further rotation of these assembled components about the axis of T-bolt 24, thus limiting the pivotal rotation of the emergency lighting unit 11 to about 325 degrees, and preventing twisting and breakage of conductors 28, which thus can never be twisted more than one complete revolution by angular pivoting adjustment of the units 11.

Encircling the threaded lower portion of T-bolt 24 beneath the azimuth limiting washer 31 is a resiliently deformable friction washer 37, which may take the form of an arched deformable metal"Belleville" washer, or of a resiliently compressible elastomer washer, either of which is compressively deformed and forced against the underside of limiting washer 31 by a threaded securing nut 38.

When T-bolt 24 is inserted through the hollow cavity 26 within swivel socket 14, through aperture 19 in collar 18, and through aperture 21 in base plate 12, the installation of washer 31, washer 37 and securing nut 38 anchors all of these assembled units together, mounting them securely on base plate 12. Tightening of nut 38 on the threaded lower end of T-bolt 24 increases the compressive deformation of washer 37, applying greater force urging washer 31 outward in frictional engagement with the underside of base plate 12, and resiliently clamping the entire assembly to base plate 12 between the underside of collar 18 and txe top surface of washer 31. This adjustable friction force tends to resist angular azimuth rotation of unit 11 about the common axis of these assembled components, but this frictional resistance may be overcome by firm manual force applied to unit 11 to move it to any desired adjusted position.

ELEVATION ADJUSTMENT

Figure 1:
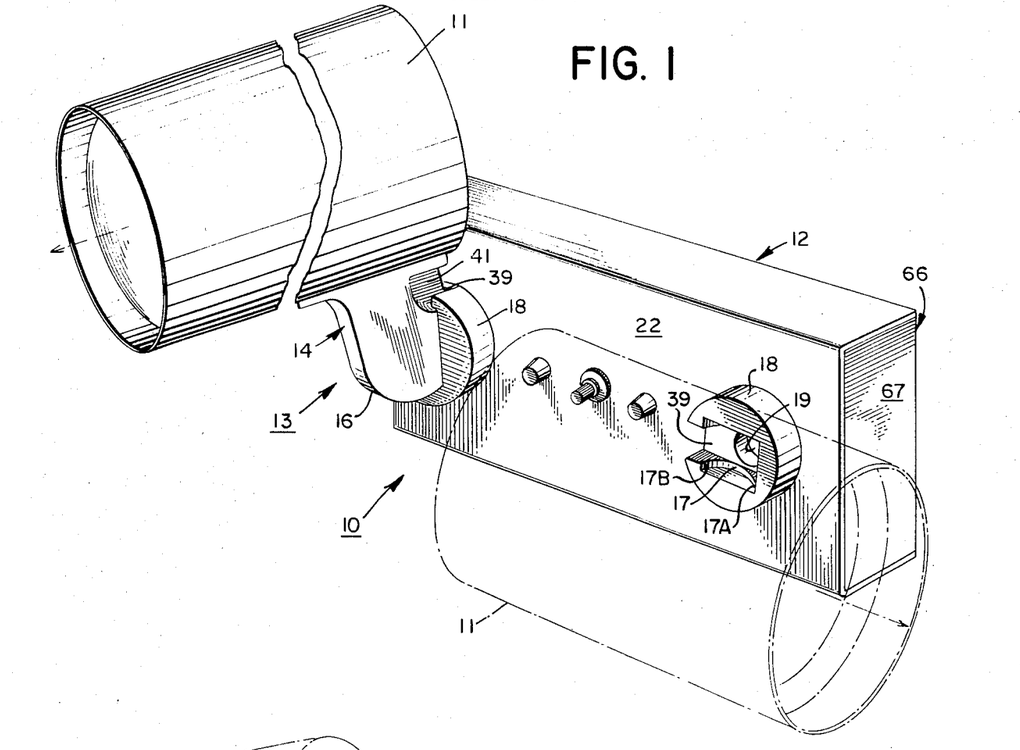
FIG. 1 is a perspective view of an emergency lighting device embodying the present invention and incorporating two universally swivel mounted emergency lighting units shown in different adjusted positions, one unit being shown in phantom to reveal the mounting structure and base plate asembly of the device.

In addition to the foregoing angular azimuth adjustment capability, the swivel socket assemblies of this invention are well adapted to provide elevation adjustment of the optic axis of the emergency lighting unit 11 from a direction roughly parallel to the face 22 of base plate or canopy 12 indicated on the right side of FIG. 1 to a direction substantially normal to face 22, as shown at the left side of FIG. 1. Elevation adjustment is made possible by different pairs of concentric trunnion surfaces formed in the swivel assembly 13 providing unusually stable widespread support, inhibiting side to side rocking motion, while readily permitting angular elevation adjustment of unit 11 about the axis of these concentric trunnion surfaces.

Figure 8:
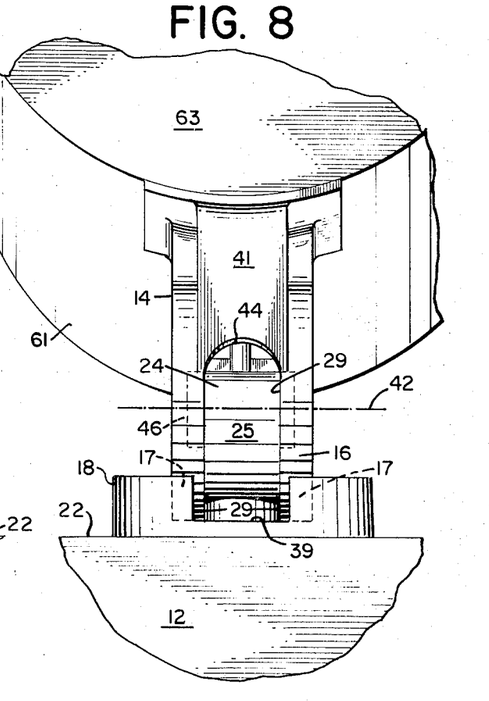
FIG. 8 is a fragmentary rear elevation view of the universal adjustable swivel portion of the device shown in FIG. 7.

As shown best in FIGS. 1, 7 and 8, the outermost pair of sector trunnion comprises sector bearing surface 16 formed at the lower end of swivel socket 14, mating with concave trunnion recesses 17 flanking aperture 19 in the upper portion of swivel collar 18. Between the two concave trunnion recesses 17 is a backtilt recess 39 of substantially uniform depth, corresponding to the maximum depth of the concave trunnion recesses 17, and extending from central aperture 19 through the rear wall of collar 18, as shown in FIGS. 1, 3, 5, 7 and 8. A mating rear rib 41 slightly narrower than backtilt recess 39 is formed on swivel socket 14, permitting the swivel socket to be rotated rearwardly about the common axis 42 of cylindrical trunnion surfaces 16-17 in a clockwise direction, from the position shown in FIG. 7 to the position shown in FIG. 5, until rib 41 fits snugly within backtilt recess 39 and seats therein, limiting the backtilt pivoting rotation of unit 11, about axis 42, to that shown in the seated positions shown in FIGS. 5 and 6.

Forward pivoting rotation of unit 11 in a counter-clock-wise direction from the position shown in FIG. 5 to the position shown in FIG. 7 is limited by the forward end 43 of the arcuate slot 29 formed in sector bearing surface 16 of swivel socket 14. The rearward end 44 of slot 29 is positioned above the level of axis 42 at the lower end of rib 41, as shown in FIGS. 7 and 8, and the width of slot 29 accomodates the threaded shank of T-bolt 24, permitting pivoting angular elevation movement of the swivel socket 14 through its full range of adjusted positions, between the rearward tilt position of FIG. 5 and the forward tilt position of FIG. 7, where forward end 43 of slot 29 abuts the forward side of the shank of T-bolt 24. The upper end of T-bolt 24 extends nearly to the elevated position of rearward end 44 of slot 29, in this forward tilted position, substantially concealing conductors 28 and blocking external access to them, providing the concealment and protection prescribed by Underwriters Laboratories requirements as shown in FIG. 8.

An inner pair of concentric mating trunnion surfaces also having a common axis coinciding with axis 42 is formed by cylindrical shoulder wing flanges 46 extending laterally from the upper end of T-bolt 24, seated in concentric concave sector recesses 47 forming the lower ends of converging guide slots formed in the internal lateral side walls of swivel socket 14, and opening into recess 26. The guide slots open inwardly on opposite sides of internal cavity 26 within swivel socket 14, thus receiving and accomodating T-bolt 24, whose lower shank end protrudes through slot 29 and aperture 19 in collar 18 to extend beneath face 22 of canopy or base plate 12. The rearward walls 48A and side walls 48B of these guide slots are substantially vertical, while the forward walls 48C diverge upwardly toward the interior of chassis 23, facilitating the downward insertion of T-bolt 24 with its shoulders 46 descending along these guide slots into seated engagement with trunnion recesses 47 at their lower end.

An additional intermediate trunnion clamping surface 25 on T-bolt 24 is formed as a similar convex sector surface likewise concentric with axis 42 and engaging an interior concave sector bearing surface 15 formed within the lower end of cavity 26 inside swivel socket 14 and flanking the slot 29. The lateral edges of convex T-bolt surface 25 thus engage the concave bearing surface 15 along both edges of slot 29, with swivel socket 14 thus being clamped between T-bolt surface 25 and concave trunnion recesses 17 in collar 18. Tightening rotation of securing nut 38 on threaded lower end of T-bolt 24 draws all of these concentric trunnion bearing surfaces together — surfaces 46 and 47, 25 and 15, and 16 and 17 — and also draws collar 18 downward into frictional engagement with face 22 of baseplate 12, anchoring all of these engaging surfaces in firm frictional contact, but permitting manual elevation tilting adjustment of unit 11 about axis 42 by elevating torque applied to chassis 23 of unit 11, overcoming the frictional force between these frictionally engaged trunnion surfaces to permit elevation adjustment of the unit 11.

Concentricity of these three pairs of trunnion surfaces provides a uniquely sturdy, stabilized assembly, frictionally secured against inadvertent blows, shocks or vibrations tending to move the unit 11 away from its desired aligned position, aimed at a predetermined target area. This stability is further enhanced by the dimensioning of the mating surfaces 16 and 17, have the same nominal radius of curvatured. External concave surface 16 of swivel socket 14 is formed to this nominal radius with a positive manufacturing tolerance, while concave recess 17 is formed to this radius with a negative manufacturing tolerance.

This assures that the radius of convex surface 16 will normally be slightly greater than the radius of concave surface 17, guaranteeing that frictional contact between these two surfaces will tend to occur near the outer end of concave recesses 17 close to the upper surface of collar 18 at widely spaced forward and rearward points 17A and 17B shown in FIGS. 3, 5 and 7. The wide spacing of frictional engagement zones 17A and 17B provides a broad based "flying buttress" support for swivel socket 14, permitting T-bolt 24 and nut 38 to anchor the socket 14 in a firm, stable position, minimizing forward and rearward rocking mevement of unit 11 about axis 42 when the swivel assembly is secured and clamped together in the assembled position shown in FIG. 4.

LOCKED ALIGNMENT

A locking screw 49 is engaged in a threaded bore 50 passing through swivel collar 18. Threaded advance of screw 49 within bore 50 brings it into abutting and jacking engagement with face 22 of base plate 12 underlying collar 18. Tightening advance of screw 49 thus forces collar 18 away from face 22 and toward trunnion surface 16 of swivel socket 14, effectively clamping all mating trunnion surfaces together to block further elevation adjustment of chassis 23. The same tightening advance of locking screw 49 also forces T-bolt 24 away from face 22, greatly increasing via nut 38 the friction force resisting rotational adjustment of assembly 13 and its azimuth limiting washer 31 relative to base plate 12.

Thus the same locking screw 49 clamps the aimed chassis 23 in any adjusted, target-aligned orientation, locking it against inadvertent mis-alignment.

HANDS-FREE TEMPORARY CANOPY SUPPORT

The canopy base plate 12 of the emergency lighting devices 10 of the present invention forms a sturdy mounting base for all adjustable components of these assemblies, which are customarily delivered to the installation site fully assembled, with the emergency lighting units 11 mounted securely in place, as shown in FIG. 1. Each retaining nut 38 is tightened on the threaded shank of its T-bolt 24 to provide the desired degree of frictional resistance to elevation and azimuth adjustment.

Since emergency lighting units 11 contain comparatively heavy components, such as a nickel cadmium storage battery and a transformer, the task of completing power line connections is complicated by the need to support each emergency lighting device 10 at or near its final installed position. The devices of this invention readily facilitate this wiring connection task by providing temporary support for the canopy 12 and its lighting units 11 in the swing-away position shown in FIG.

2. A flanged mounting plate 66 is provided with suitable apertures through which it is secured to conventional outlet boxes recessed in walls, ceilings, columns or other architectural surfaces, and also adapted for direct wall mounting by additional lag screws, toggle bolts or the like. The mounting plate 66 is provided with rectangular end flanges 67 dimensioned to fit into the channel-shaped ends of the canopy or base plate 12, as indicated in FIGS. 1 and 2. In addition the mounting plate 66 is provided with top and bottom flanges 68 and 69 which are substantially identical, and provided with T-shaped mounting slots 71 at their respective ends near end flanges 67. Each slot 71 is formed by a longitudinal support slot 72 connected by an access slot 73 to the exposed outer edge of the flange 68 or 69. A tapped hole 74 is provided in each flange 68 and 69 adjacent to the acess slot 73 of each T-shaped mounting slot 71.

Depending at each end from the top flange 76 of the channel shaped canopy 12 is a short support post 77, positioned and dimensioned for sliding engagement along an access slot 73 into supported position protruding through a support slot 72 as shown in the central portion of FIG. 2. The suport post 77 at either end of canopy 12 may be employed for this purpose, permitting either left hand or right hand access support of canopy 12 in temporary position for connecting conductors 28 to power line conductors 78, protruding through a suitable wiring knockout opening in mounting plate 66.

When wiring is completed, canopy 12 is maneuvered to move support post 77 along support slot 72 and out through access slot 73 to free the canopy from the mounting plate 66, afte which the canopy 12 is positioned parallel to and facing mounting plate 66. In this position, the canopy 12 is moved toward mounting plate 66, causing both support posts 77 to enter their respective access slots 73 at opposite ends of mounting plate 66. Posts 77 are advanced into support slots 72 and displaced laterally to one end of each respective support slot 72, to the seated position shown in FIG. 4.

In this position, the ends of channel-shaped canopy 12 are flush with end flanges 67 of mounting plate 66, as shown in FIG. 1, and screw mounting holes 79 in the lower flange of canopy 12 are aligned with tapped holes 74 in bottom flange 69 of mounting plate 66. Mounting screws 81 are then inserted through the aligned screw holes 79 and 74 at each end of the assembly and tightened to secure canopy 12 to mounting plate 66 in its assembled installed and wired condition.

This temporary "hands-free" support of the assembled emergency lighting unit 10 on its installed mounting plate 66 in the position shown in FIG. 2 provides ready access for electrical wiring, and no auxiliary support or extra laborers are required for this purpose. As soon as wiring is completed, the unit 10 is readily maneuvered into its installed position and locked in place by the mounting screws 81 in the installed position shown in FIG. 1.

SELF-CONTAINED EMERGENCY LIGHTING UNITS

As shown in FIG. 3, the swivel socket 14 forms a downwardly depending unitary portion preferably cast integrally with chassis 23, on which the various components of the self-contained emergency lighting unit 11 are mounted. In FIG. 4, these various components are illustrated in their assembled position. A flood lamp, preferably a sealed beam lamp 51 is anchored by a bayonet bezel rim 52 to the outermost end of chassis 23, with its socket portion 53 extending rearwardly through a central aperture in a printed circuit board 54 on which are mounted the transfer switching circuitry and the rectifier components required to convert AC power line current into direct current for charging a battery 56. Transformer 57 is mounted on lateral pedestals 58 shown in FIG. 3, and the battery is secured in position on battery mounting bosses 59, held by an anchor strap 60, or by other comparable clips and securing devices. A dust-cover shroud 61, preferably formed as a cylindrical tube, fits snugly around chassis 23 and all the components mounted thereon, with a suitable cutout in the rear lower end of shroud 61 interfitting with a shroud retaining flange 62 at the forward end of swivel socket 14; the rear end of shroud 61 fits snugly around a disc shaped integral rear wall 63 forming the rear end of chassis 23, completely enclosing the self contained emergency lighting components and forming a decorative dust cover concealing and protecting them.

One operative embodiment of the self contained emergency lighting devices of this invention has these operating characteristics:

AC supply voltage: — 120 volts ± 10 percent.
Power comsumption: — 20 watts.
Battery type: — Sealed 6-volt lead-acid calcium-grid storage battery, one per unit.
Battery float voltage: —6.75 volts±0.05 at 72° F.
Discharge duty cycle: — 18 watts per unit for 1 ½ hours to 87 ½ percent battery voltage; 1500 candle power initial light output per unit.
Recharge duty cycle: — 12 hours for full recharge from 87 ½ percent battery voltage. Continuous automatic float-charge operation after full-charge voltage restored.
Lighting head position adjustment: — Universal swivel, 325° rotation, 115° tilt, single locking screw.
Charger type: — Solid state: full-wave silicon diode rectification, silicon controlled rectifier output control, Zener diode voltage regulation.
Transfer means: — Transfer circuit energizes lamps(s) on loss of AC.

Since all operating components of these emergency lighting devices are permanently installed inside dust cover shrouds 61, heavy, bulky and unattractive wall mounted enclosures or wall-recessed cabinets are not needed to conceal batteries, rectifiers, transformers and transfer switching circuitry. Accordingly, this invention provides novel and strikingly attractive lighting units incorporating in themselves all power supply and switching components required for dependable emergency lighting service, meeting all construction code and Underwriters Laboratories requirements.

This invention achieves this highly useful result through the unexpectedly sturdy adjustable support of the shroud-enclosed chassis 23 and its integral depending swivel socket 14 provided by the resilient-friction biased swivel assembly 13. The "moment arm" of each unit 11 is minimized by maintaining its center of gravity as close as possible to swivel assembly 13. This is achieved by placing the heaviest components, battery 56 and transformer 57, closest to assembly 13. The swivel assembly may be adjusted manually to aim the optic axis of spotlight 51 toward almost any point before the plane of face 22 of base plate 12, and can then be locked firmly in its aimed position by a single adjustment of locking screw 49.

For this reason, the swivel assembly is well adapted to support many different types of relatively heavy, aimable devices. Television camera monitors, aimable microphones and radiant energy intrusion sensors all possess otpic or aiming "target" axes requiring target alignment toward a selected target area to maximize transmission or reception of sound, light or other radiant energy by a principal energy delivery component. This alignment is readily achieved by aiming adjustment of swivel assembly 13, and it is maintained unchanged by locking screw 49.

The cooperating pairs of trunnion surfaces incorporated in swivel assembly 13 provide ready pivoting for elevation adjustment, combined with widely spaced lines of action for the load-carrying support forces, thus firmly stabilizing the supported chassis 23. These trunnion surfaces are concentric about pivoting axis 42, and they are preferably sectors of right circular cylinders for ease of manufacture and maximum load-spreading, stabilizing action, with minimum adjusting friction. Pivoting sliding ball-and-socket "surfaces of revolution," such as those shown in U.S. Pat. Nos. 1,879,343, 2,862,730, 3,104,067, 3,186,736, 3,278,203 and 3,341,230, fail to provide the desired load-spreading, reduced-friction stabilizing action. Furthermore, these conventional ball-and-socket assemblies, even when spring biased, do not incorporate a hollow, resiliently biased T-bolt cooperating with two or more pairs of concentric trunnion surfaces, and thus do not provide adjustable-friction biasing action. These swivel assemblies thus provide unexpectedly high load-carrying capability, and permit fully self-contained aimable devices to be mounted on adjustable and lockable swivel assemblies 13 as independent, unitary installations, requiring no separate housings for power supplies or other accessory components.

Since the foregoing description and drawings are merely illustrative, the scope of the invention has been broadly stated herein and it should be liberally interpreted to secure the benefit of all equivalents to which the invention is fairly entitled.

What is claimed is:

1. An aimable-axis device for mounting on an architectural surface comprising
    a base plate provided with securing means for mounting it on the architectural surface and having a mounting aperture therein;
    a chassis supporting a principal energy conversion component having an aimable target axis;
    a swivel assembly adjustably connecting the chassis to the base plate and incorporating
        a hollow swivel socket extending from the chassis toward the base plate and having
            a first convex trunnion sector surface facing the base plate
            and a second concave internal trunnion sector surface,
            both trunnion surfaces being concentric about a common pivoting axis and adjacent to an elongated pivoting slot in said socket,
        collar means adjacent to the base plate mounting aperture and forming a first concave trunnion surface embracing the first convex trunnion sector surface of the socket,
        a hollow T-bolt having
            a bored shank extending through the socket's pivoting slot and the base plate's mounting aperture,
            a laterally extending second convex trunnion sector surface dimensioned for embraced engagement by the second concave internal trunnion surface of the socket,
            and securing means mounted on the end of the T-bolt's shank preventing withdrawal of the T-bolt and maintaining the first trunnion surfaces and the second trunnion surfaces in respective sliding engagement,
    whereby the chassis and its swivel socket may be pivotally adjusted about said pivoting axis relative to the base plate for elevation aiming of said aimable target axis.

2. The aimable-axis device defined in claim 1, further including locking means forcing said embracing pairs of trunnion surfaces together into non-sliding engagement.

3. The aimable-axis device defined in claim 1 wherein the collar means comprises a movable swivel collar having
    a central aperture aligned with said mounting aperture receiving said T-bolt;
    a lower face slidingly rotatable on said base plate,
    and a socket face having said first concave trunnion surface recessed therein.

4. The aimable-axis device defined in claim 3, further including a locking screw threadedly engaged in a tapped bore formed in said swivel collar opening toward the base plate, whereby advance of the locking screw against the base plate forces said embracing pairs of trunnion surfaces together into non-sliding engagement.

5. The aimable-axis device defined in claim 1, wherein a plurality of electrical conductors extend from the chassis through the swivel socket and the bored shank of the hollow T-bolt into the space beneath the base plate, and wherein the T-bolt is provided with a head underlying the swivel socket's elongated pivoting slot and shielding said conductors against external access therethrough.

6. The aimable-axis device defined in claim 2, wherein said securing means includes a resiliently compressible washer encircling said T-bolt's shank and an adjustable securing nut threadedly engaging a threaded terminal portion of said shank and sandwiching said compressible washer and said base plate between itself and said first convex trunnion sector surface, providing adjustable resilient biasing force urging said embracing pairs of trunnion surfaces together into frictional sliding engagement which is converted into non-sliding engagement by said locking means.

7. The aimable axis device defined in claim 3 wherein said collar means further includes an azimuth limiting extension rotatable with said swivel collar into abutting engagement with a limit flange protruding from the base plate into interfering alignment with said extension at a predetermined azimuth limit stop position, thereby confining the adjustable azimuth rotation of said swivel collar to less than a full revolution about said T-bolt shank.

8. The aimable-axis device defined in claim 1 wherein said second concave internal trunnion surface in the swivel socket is divided into at least two concave surfaces positioned at different radial distances from said pivoting axis, and wherein said T-bolt is provided with corresponding convex trunnion surfaces at corresponding radial distances.

9. The aimable-axis device defined in claim 1 wherein said first concave trunnion surface subtends an angle substantially less than 180° at a radius of curvature slightly smaller than that of said first convex trunnion surface, which therefore engages said first concave trunnion surface at points spaced apart near the ends of said concave trunnion surface for stabilized support of the swivel assembly.

10. The aimable-axis device defined in claim 1 further including a mounting plate engageable with said base plate for anchoring attachment to said architectural surface, wherein said mounting plate includes an aperture engageable with a support projection on said base plate for temporary support thereof, facilitating electrical wiring connection of electrical conductors extending from said chassis through said hollow T-bolt with power lines emerging from said architectural surface.

11. The aimable-axis device defined in claim 1 wherein the principal energy conversion component is an emergency lighting spotlight whose aimable target axis is the spotlight's optic axis to be aimed at an emergency exit during line power failure.

12. The aimable emergency spotlight device defined in claim 11, wherein the spotlight is electrically connected to power lines installed in the architectural surface by way of electrical components mounted on said chassis including a transformer, a rectifier, a storage battery and transfer switching circuitry supplying charging current to said storage battery during normal power line operation, and automatically connecting said storage battery to illuminate the spotlight during line power failures.

13. The aimable emergency spotlight device defined in claim 12 wherein the storage battery is the one of said electrical components most closely adjacent to the swivel socket.

14. The aimable emergency spotlight device defined in claim 12 wherein a dust-cover shroud associated with the chassis surrounds all of said electrical components, forming with said swivel socket assembly and said base plate a protective enclosure for all of said electrical components and their associated electrical conductors.

* * * * *

UNITED STATES PATENT OFFICE
CERTIFICATE OF CORRECTION

Patent No. 3,772,527            Dated November 13, 1973

Inventor(s) Richard Henry Darling & William P. Shine

It is certified that error appears in the above-identified patent and that said Letters Patent are hereby corrected as shown below:

In the Abstract, line 14, "covcavely" should read
-- concavely --

Column 1, line 9, --mounted-- should be inserted after "commonly"

Column 1, line 50, "positins" should read -- positions --

Column 2, line 7, "wall" should read -- walls --

Column 2, line 59, "exloded" should read -- exploded --

Column 4, line 30, "txe" should read -- the --

Column 6, line 7, -- which -- should be inserted before "have"

Column 6, line 8, "curvatured" -- should read --curvature--

Column 6, line 24, "mevement" should read -- movement --

Column 7, line 34, "afte" should read -- after --

Column 9, line 9, "otpic" should read -- optic --

Signed and sealed this 9th day of April 1974.

(SEAL)
Attest:

EDWARD M. FLETCHER, JR.
Attesting Officer

C. MARSHALL DANN
Commissioner of Patents